US006243782B1

United States Patent
Woolsey et al.

(10) Patent No.: US 6,243,782 B1
(45) Date of Patent: Jun. 5, 2001

(54) METHOD AND APPARATUS FOR DISABLING A GRAPHICS DEVICE WHEN AN UPGRADE DEVICE IS INSTALLED

(75) Inventors: Clark T. Woolsey, Carmichael, CA (US); Jeffery M. Michelsen, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,184

(22) Filed: Dec. 31, 1998

(51) Int. Cl.[7] ................................................. G06F 13/00
(52) U.S. Cl. .............................. 710/129; 710/8; 710/103; 345/520
(58) Field of Search ........................... 710/102, 103, 710/2, 15, 101, 129, 72, 8; 713/100; 345/133, 156, 520

(56) References Cited

U.S. PATENT DOCUMENTS

| 5,280,579 | * | 1/1994 | Nye . |
| 5,515,514 | * | 5/1996 | Dhuey et al. . |
| 5,996,037 | * | 11/1999 | Emnett . |

* cited by examiner

Primary Examiner—Gopal C. Ray
(74) Attorney, Agent, or Firm—Calvin Wells

(57) ABSTRACT

One embodiment of a graphics device that can be disabled when an upgrade graphics device is installed is described. The graphics device includes an interface to a bus and an input to receive a device disable signal. When the device disable signal is asserted, the interface to the bus places its buffers in a high impedance state, meaning that the graphics device is electrically isolated from the bus. When the device disable signal transitions from asserted to deasserted, a reset circuit in the graphics device resets the graphics device.

18 Claims, 2 Drawing Sheets

METHOD AND APPARATUS FOR DISABLING A GRAPHICS DEVICE WHEN AN UPGRADE DEVICE IS INSTALLED

FIELD OF THE INVENTION

The present invention pertains to the field of computer systems. More particularly, this invention pertains to the field of installing an upgrade graphics device in the presence of a previously installed graphics device.

BACKGROUND OF THE INVENTION

High performance graphics devices are becoming increasingly important in today's computer systems. Computer system manufacturers commonly install graphics accelerators on add-in cards that plug into connectors that provide connection to a graphics bus such as an accelerated graphics port (AGP) bus. Graphics accelerators are also commonly installed by soldering the component directly onto computer system motherboards. The add-in card method provides the computer system manufacturer and the end user a means for installing a newer model graphics accelerator. One can simply remove the old add-in card and install a new one. The add-in card method has a drawback in that the add-in card method is more expensive than the solder-down method. The add-in card also uses more space than a device soldered directly onto the motherboard.

The solder-down method provides a cost savings over the add-in card method, but has the disadvantage of not providing a method for upgrading the graphics accelerator. If a computer system manufacturer wishes to change to a different graphics accelerator, the computer system manufacturer must redesign the motherboard. Further, the AGP bus is meant to be a point-to-point interconnect between a system memory controller and a single graphics device, and prior computer systems that utilize an AGP bus are not able to provide an upgrade option when a graphics device is already soldered onto the motherboard.

SUMMARY OF THE INVENTION

A method and apparatus for disabling a graphics device when an upgrade graphics device is installed is disclosed. The apparatus includes a bus interface that includes a plurality of bus signal buffers. The apparatus also includes a reset circuit and a disable input. The disable input receives a device disable signal. The bus interface unit places the bus signal buffers in a high impedance state when the device disable signal is asserted, and the reset circuit resets the apparatus following a device disable signal transition from asserted to deasserted.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of a graphics device that can be disabled when an upgrade graphics device is installed is disclosed. The graphics device includes an interface to a bus and an input to receive a device disable signal. When the device disable signal is asserted, the interface to the bus places its buffers in a high impedance state, meaning that the graphics device is effectively electrically isolated from the bus. When the device disable signal transitions from asserted to deasserted, a reset circuit in the graphics device resets the graphics device. An intended advantage of the embodiment is to allow the installation of an upgrade graphics device when a graphics device is already installed. An additional intended advantage of the embodiment is to allow computer system manufacturers to solder a graphics device onto a motherboard and to provide an add-in slot that can accommodate an add-in card for an upgrade graphics device. Both the soldered-down device and the add-in card may reside on an AGP bus. A further intended advantage of the embodiment is to allow computer system manufacturers to install upgrade graphics devices without the need to redesign a motherboard.

Figure 1:
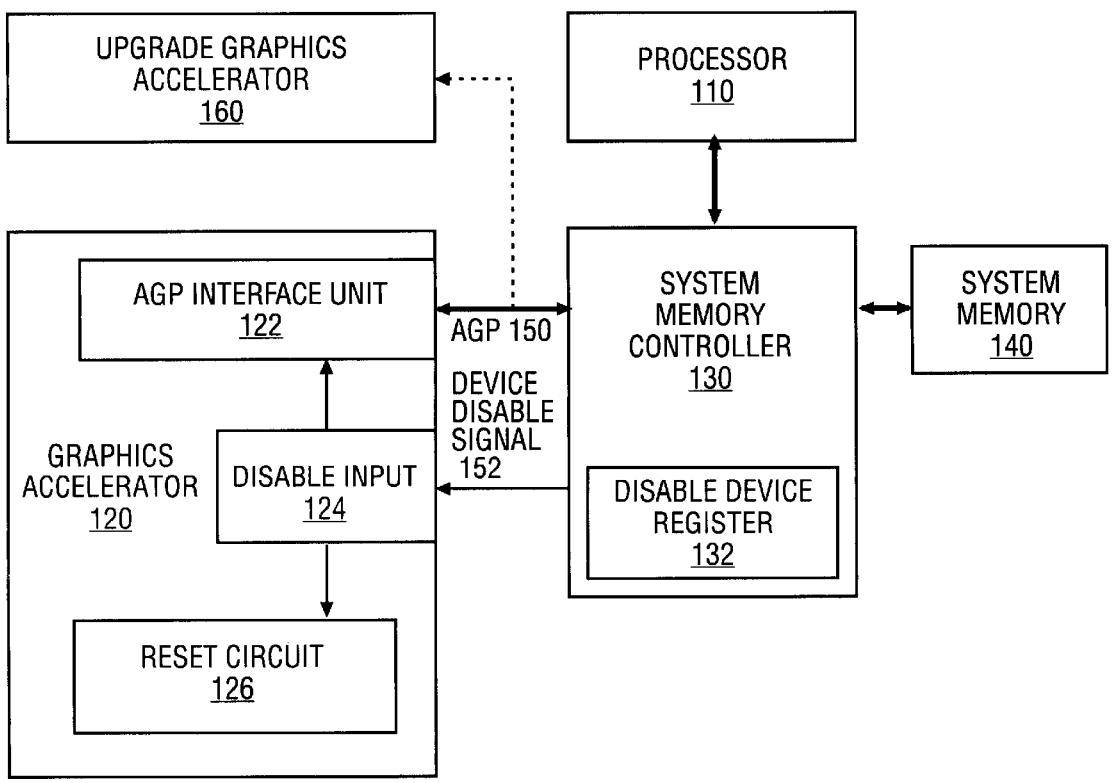
FIG. 1 shows a block diagram of one embodiment of a system that disables a graphics device when an upgrade graphics device is installed.

FIG. 1 shows a block diagram of one embodiment of a system 100 that allows the installation of an upgrade graphics device when a graphics device is already installed. The system 100 includes a processor 100, a system memory controller 130, a system memory 140, a graphics accelerator 120, and an optional upgrade graphics accelerator 160. The system memory controller 130 includes a disable device register 132 whose value determines whether a device disable signal 152 is to be asserted or deasserted by the system memory controller 130. The device disable register 132 may be a single bit in a larger register. The graphics accelerator 120 includes a reset circuit 126, a disable input 124, and an AGP interface unit 122. The AGP interface unit 122 is coupled to an AGP bus 150. The AGP interface unit 122 includes buffers that provide electrical connection to the AGP bus 150. The disable input 124 receives the device disable signal 152 from the system memory controller 130.

The optional upgrade graphics accelerator 160 is preferably coupled to the AGP bus 150 through an add-in card connector. Thus, the upgrade graphics accelerator 160 may be installed or removed as the computer system manufacturer or end user may desire. It is contemplated that a computer system manufacturer may initially manufacture a computer system with the graphics accelerator 120 soldered onto a motherboard and would provide an add-in card connector that can accommodate an upgrade graphics device.

When the system 100 is first powered up, or upon a reset of system 100, the disable device register 132 preferably initially contains a value that indicates that the disable device signal 152 is to be asserted. When the disable device signal 152 is asserted, the AGP interface unit 122 causes all of its buffers that connect to the AGP bus to enter a high impedance state. The term "high impedance state" as used herein includes any state where the buffers neither drive nor sink substantial current to or from the AGP bus 150. It is also preferable for the graphics accelerator 120 to enter a low-power state when the disable input receives an asserted device disable signal 152.

After power up or upon a system reset, configuration software is executed to determine whether the upgrade graphics accelerator 160 is installed. If the configuration software determines that the upgrade processor is installed, then the disable device register 132 maintains a value that indicates that the device disable signal is to be asserted. If the configuration software determines that the upgrade graphics accelerator 160 is not installed, then a value is written to the disable device register 132 that indicates that the device disable signal 152 should be deasserted. When the disable device register 132 contains a value that indicates that the device disable signal 152 should be deasserted, the system memory controller 130 deasserts the device disable signal 152.

When the device disable signal 152 transitions from asserted to deasserted, the reset circuit 126 resets the graphics accelerator 120 in order to prepare the graphics accelerator 120 for operation.

Although the above discussion in connection with FIG. 1 mentions the use of an AGP bus and a graphics accelerator, other embodiments may include other bus types as well as other types of peripheral devices.

Figure 2:
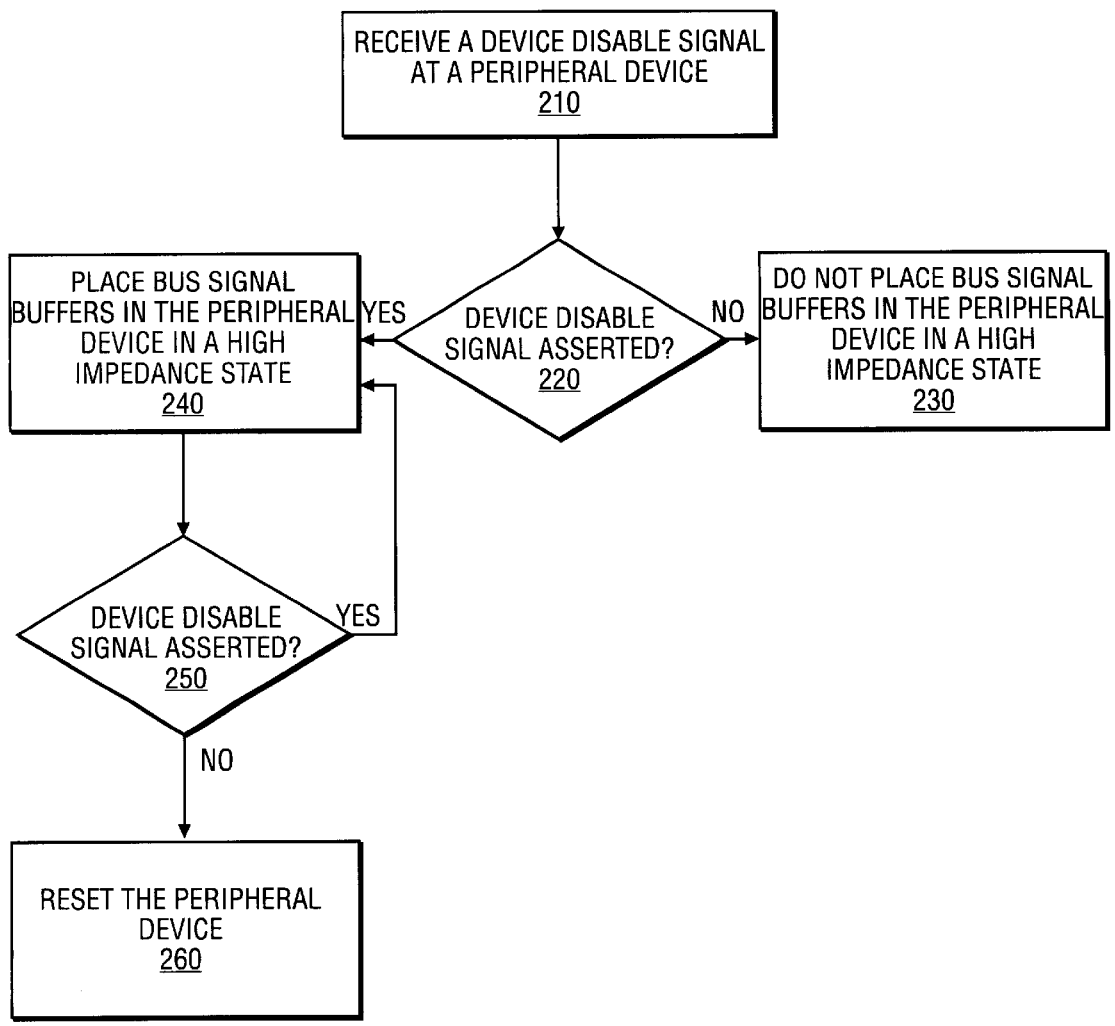
FIG. 2 is one embodiment of a method to disable a peripheral device when an upgrade device is installed.

FIG. 2 is a flow diagram of one embodiment of a method to disable a peripheral device when an upgrade device is installed. At step 210 a device disable signal is received at a peripheral device. If the device disable signal is not asserted at step 220, then the bus signal buffers in the peripheral device are not placed in a high impedance state at step 230. In other words, the signal buffers operate in a normal fashion. If the device disable signal is asserted at step 220, then the bus signal buffers in the peripheral device are placed in a high impedance state at step 240. Following step 240, if the device disable signal ever transitions from asserted to deasserted at step 250, then the peripheral device is reset at step 260.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a bus interface unit including a plurality of bus signal buffers;
   a reset circuit; and
   a disable input to receive a device disable signal, the bus interface unit to place the bus signal buffers in a high impedance state when the device disable signal is asserted, and the reset circuit to reset the apparatus following a device disable signal transition from asserted to deasserted.

2. The apparatus of claim 1 further comprising a low power unit to place the apparatus into a low power mode when the device disable signal is asserted.

3. The apparatus of claim 2, wherein the apparatus is a graphics accelerator.

4. The apparatus of claim 3, the bus interface unit to interface with an accelerated graphics port bus.

5. The apparatus of claim 4, the disable input to receive the disable device signal from a system logic device.

6. A system, comprising:
   a system bus;
   a peripheral device coupled to the system bus, the peripheral device including
      a system bus interface unit including a plurality of bus signal buffers,
      a reset circuit, and
      a disable input to receive a device disable signal, the bus interface unit to place the bus signal buffers in a high impedance state when the device disable signal is asserted, and the reset circuit to reset the peripheral device following a device disable signal transition from asserted to deasserted; and
   a system logic device to transmit the device disable signal to the disable input of the peripheral device.

7. The system of claim 6, wherein the peripheral device includes a low power unit to place the peripheral device into a low power mode when the device disable signal is asserted.

8. The system of claim 7, wherein the peripheral device is a graphics accelerator.

9. The system of claim 8 further comprising an upgrade graphics accelerator installed on the system bus.

10. The system of claim 9, wherein the system bus includes an accelerated graphics port bus.

11. The system of claim 10, wherein the system logic device includes a register to indicate whether the device disable signal is to be asserted or deasserted.

12. The system of claim 11, wherein the system logic device asserts the disable device signal upon a reset of the system.

13. The system of claim 12 further comprising a processor coupled to the system logic device, the processor executing a software agent to determine whether the upgrade graphics accelerator is installed, the software agent to cause the system logic device to assert the device disable signal if the upgrade graphics accelerator is installed, the software agent further to cause the system logic device to deassert the device disable signal if the upgrade graphics device is not installed.

14. A method, comprising:
   receiving a device disable signal at a peripheral device;
   placing a plurality of bus signal buffers in the peripheral device in a high impedance state if the device disable signal is asserted; and
   resetting the peripheral device upon a transition from asserted to deasserted of the device disable signal.

15. The method of claim 14, further comprising placing the peripheral device into a low power mode if the device disable signal is asserted.

16. The method of claim 15 wherein placing the plurality of bus signal buffers in a high impedance state includes placing a plurality of bus signal buffers that are coupled to an accelerated graphics port in a high impedance state.

17. The method of claim 16, further comprising transmitting the device disable signal from a system logic device to the peripheral device.

18. The method of claim 17, further comprising:
   executing a software agent to determine whether an upgrade graphics accelerator is installed;
   asserting the device disable signal if the upgrade graphics accelerator is installed; and
   deasserting the device disable signal if the upgrade graphics device is not installed.

* * * * *